US009160772B2

(12) United States Patent
Siegel et al.

(10) Patent No.: US 9,160,772 B2
(45) Date of Patent: *Oct. 13, 2015

(54) METHOD AND APPARATUS FOR ENABLING REGISTRATION OF AGGREGATE END POINT DEVICES THROUGH PROVISIONING

(71) Applicant: AT&T Intellectual Property I, L.P., Atlanta, GA (US)

(72) Inventors: Steven A. Siegel, Mendham, NJ (US); Martin C. Dolly, Forked River, NJ (US); Leticia D. Johnson, Helotes, TX (US); Nancy E. Lambros, Spicewood, TX (US); Ricardo E. Sabat, Monroe Township, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 275 days.

This patent is subject to a terminal disclaimer.

(21) Appl. No.: 13/850,097

(22) Filed: Mar. 25, 2013

(65) Prior Publication Data

US 2013/0215882 A1 Aug. 22, 2013

Related U.S. Application Data

(63) Continuation of application No. 12/647,541, filed on Dec. 27, 2009, now Pat. No. 8,406,183.

(51) Int. Cl.
| | |
|---|---|
| *H04W 4/00* | (2009.01) |
| *H04W 40/00* | (2009.01) |
| *H04W 60/00* | (2009.01) |
| *H04L 12/28* | (2006.01) |
| *G06F 15/16* | (2006.01) |
| *H04L 29/06* | (2006.01) |
| *H04L 29/12* | (2006.01) |
| *H04M 7/12* | (2006.01) |

(52) U.S. Cl.
CPC ...... *H04L 65/1073* (2013.01); *H04L 29/12188* (2013.01); *H04L 61/1588* (2013.01); *H04L 61/3085* (2013.01); *H04L 65/1016* (2013.01); *H04M 7/123* (2013.01)

(58) Field of Classification Search
CPC ............ H04L 61/1529; H04L 61/1588; H04L 29/12188; H04L 61/1535; H04W 8/02; H04W 8/04; H04W 60/00; H04W 60/04; H04W 72/04; H04W 80/04; H04W 80/10; H04W 84/12; H04W 84/18; H04W 88/08; H04W 88/085; H04M 7/123; H04M 7/127
See application file for complete search history.

(56) References Cited

U.S. PATENT DOCUMENTS

| | | | |
|---|---|---|---|
| 7,480,915 B2 * | 1/2009 | Costa Requena et al. .... | 719/311 |
| 7,561,535 B2 | 7/2009 | Naqvi et al. | |
| 7,606,202 B2 * | 10/2009 | Marathe et al. ............... | 370/331 |
| 7,912,042 B2 | 3/2011 | Falkena et al. | |
| 7,936,665 B2 | 5/2011 | Ishii | |
| 8,249,562 B2 * | 8/2012 | Walker et al. .............. | 455/414.1 |
| 8,340,626 B2 * | 12/2012 | Edge .......................... | 455/404.1 |

(Continued)

*Primary Examiner* — Alpus H Hsu

(57) ABSTRACT

A method and apparatus for enabling registration of an Aggregate End Point (AEP) device that is incapable of supporting a Session Initiation Protocol (SIP) based Internet Protocol Multimedia Subsystem (IMS) registration are disclosed. The method performs a static registration of the AEP device in a plurality of network elements associated with an Internet Protocol Multimedia Subsystem (IMS) network by provisioning. The method then processes an originating call request or a terminating call request associated with the AEP device using the static registration.

20 Claims, 6 Drawing Sheets

(56) References Cited

U.S. PATENT DOCUMENTS

| | | | |
|---|---|---|---|
| 8,351,461 B2* | 1/2013 | Duffy et al. | 370/467 |
| 8,406,183 B2* | 3/2013 | Siegel et al. | 370/329 |
| 8,572,708 B2* | 10/2013 | Barriga et al. | 726/8 |
| 8,798,253 B2* | 8/2014 | Allen et al. | 379/265.01 |
| 2004/0243680 A1* | 12/2004 | Mayer | 709/206 |
| 2005/0041578 A1 | 2/2005 | Huotari et al. | |
| 2006/0079236 A1 | 4/2006 | Del Pino et al. | |
| 2006/0117187 A1 | 6/2006 | Hollatz et al. | |
| 2006/0129646 A1 | 6/2006 | Rhee et al. | |
| 2006/0245567 A1 | 11/2006 | Shaffer et al. | |
| 2006/0268698 A1 | 11/2006 | Shaffer et al. | |
| 2006/0291487 A1 | 12/2006 | Naqvi et al. | |
| 2006/0294245 A1* | 12/2006 | Raguparan et al. | 709/227 |
| 2007/0088836 A1 | 4/2007 | Tai et al. | |
| 2007/0100981 A1* | 5/2007 | Adamczyk et al. | 709/223 |
| 2007/0197227 A1 | 8/2007 | Naqvi et al. | |
| 2007/0213078 A1 | 9/2007 | Shaheen | |
| 2008/0162637 A1* | 7/2008 | Adamczyk et al. | 709/204 |
| 2008/0181198 A1 | 7/2008 | Yasrebi et al. | |
| 2008/0194258 A1 | 8/2008 | Chiu et al. | |
| 2008/0215736 A1* | 9/2008 | Astrom et al. | 709/226 |
| 2008/0254795 A1 | 10/2008 | Ratcliffe et al. | |
| 2008/0299980 A1 | 12/2008 | Buckley et al. | |
| 2008/0317010 A1 | 12/2008 | Naqvi et al. | |
| 2009/0067409 A1 | 3/2009 | Ku et al. | |
| 2009/0067417 A1 | 3/2009 | Kalavade et al. | |
| 2009/0082019 A1* | 3/2009 | Marsico | 455/435.2 |
| 2009/0086740 A1* | 4/2009 | Al-Bakri et al. | 370/401 |
| 2009/0086742 A1 | 4/2009 | Ghai et al. | |
| 2009/0144429 A1* | 6/2009 | Astrom | 709/227 |
| 2009/0190573 A1* | 7/2009 | Siegel et al. | 370/352 |
| 2009/0191873 A1* | 7/2009 | Siegel et al. | 455/435.2 |
| 2009/0215454 A1* | 8/2009 | Przybysz et al. | 455/435.1 |
| 2009/0235299 A1* | 9/2009 | Astrom et al. | 725/25 |
| 2010/0014436 A1 | 1/2010 | Talagery | |
| 2010/0075642 A1 | 3/2010 | Ejzak et al. | |
| 2010/0098056 A1 | 4/2010 | Falkena et al. | |
| 2010/0110978 A1 | 5/2010 | Falkena et al. | |
| 2010/0128716 A1* | 5/2010 | Lu et al. | 370/352 |
| 2010/0153567 A1 | 6/2010 | Lu et al. | |
| 2010/0198975 A1 | 8/2010 | Willars et al. | |
| 2010/0217875 A1* | 8/2010 | Belinchon Vergara et al. | 709/228 |
| 2010/0232417 A1 | 9/2010 | Segre | |
| 2010/0306397 A1* | 12/2010 | Belinchon Vergara et al. | 709/230 |
| 2011/0028130 A1* | 2/2011 | Swaminathan et al. | 455/414.1 |
| 2011/0216763 A1* | 9/2011 | Wahl et al. | 370/352 |
| 2012/0096162 A1* | 4/2012 | Cecilia Torralba et al. | 709/225 |
| 2012/0219127 A1* | 8/2012 | Lu et al. | 379/88.17 |

* cited by examiner

METHOD AND APPARATUS FOR ENABLING REGISTRATION OF AGGREGATE END POINT DEVICES THROUGH PROVISIONING

This application is a continuation of U.S. patent application Ser. No. 12/647,541, filed Dec. 27, 2009, which is currently allowed and is herein incorporated by reference in its entirety.

The present disclosure relates generally to communication network and, more particularly, to a method and apparatus for enabling registration of Aggregate End Point (AEP) devices that do not support Session Initiation Protocol (SIP) based Internet Protocol Multimedia Subsystem (IMS) registration in an Internet Protocol Multimedia Subsystem (IMS) network through provisioning by a service provider.

BACKGROUND

In an IMS network, each SIP User Agent (UA) is provisioned in the Home Subscriber Server (HSS), and the User Agent must first register with the network before making and receiving calls. In one example, the SIP User Agents are individual user endpoints. In contrast, an Aggregate Endpoint (AEP) is an endpoint that has multiple subtending users, but appears as a single SIP User Agent to the IMS network. Most of the endpoints supported by existing Voice over Internet Protocol (VoIP) services for enterprise applications, e.g., an Internet Protocol Private Branch eXchange (IP PBX), have multiple users behind it and may not perform standard SIP based IMS registrations.

Unlike single user endpoints, calls will always be allowed to or from the IP PBX. However, unregistered users behind an IP PBX are unable to utilize services provided by an IMS network.

SUMMARY

In one embodiment, the present method and apparatus enable registration of an Aggregate End Point (AEP) device that is incapable of supporting a Session Initiation Protocol (SIP) based Internet Protocol Multimedia Subsystem (IMS) registration. The method performs a static registration of the AEP device in a plurality of network elements associated with an Internet Protocol Multimedia Subsystem (IMS) network by provisioning. The method then processes an originating call request or a terminating call request associated with the AEP device using the static registration.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

As discussed above, many AEP devices are incapable of performing SIP based IMS registrations and are treated as unregistered endpoint devices by an IMS network. To address this criticality, the present method and apparatus enable registration of AEP devices that do not support SIP based IMS registration in an IMS network through provisioning by a service provider. In other words, the present method and apparatus allow a service provider of an IMS network to provision key network elements on behalf of an AEP device that are incapable of performing SIP registration so that the AEP can be treated as registered. By performing static registration through provisioning by a service provider on behalf of the AEP device that is incapable of performing SIP based registration, the AEP can receive consistent service treatment in an IMS network extended to endpoints that are capable of SIP based registration.

In one embodiment, the present method and apparatus enable static registration of call processing network elements through provisioning initiated and performed by a service provider of an IMS network to support services for AEP devices (e.g., IP PBX) connected via an access trunk interface. These AEP devices are incapable of performing dynamic SIP based registration with an IMS network. For example, the call processing network elements that need to be provisioned include the Proxy Call Session Control Function (P-CSCF), the Serving Call Session Control Function (S-CSCF), the Home Subscriber Server (HSS), and all Application Server (AS) that are used to process call requests associated with the AEP devices. The static registration performed via provisioning will remain in the network elements until it is changed or deleted by the service provider and will not be timed out.

Figure 1:
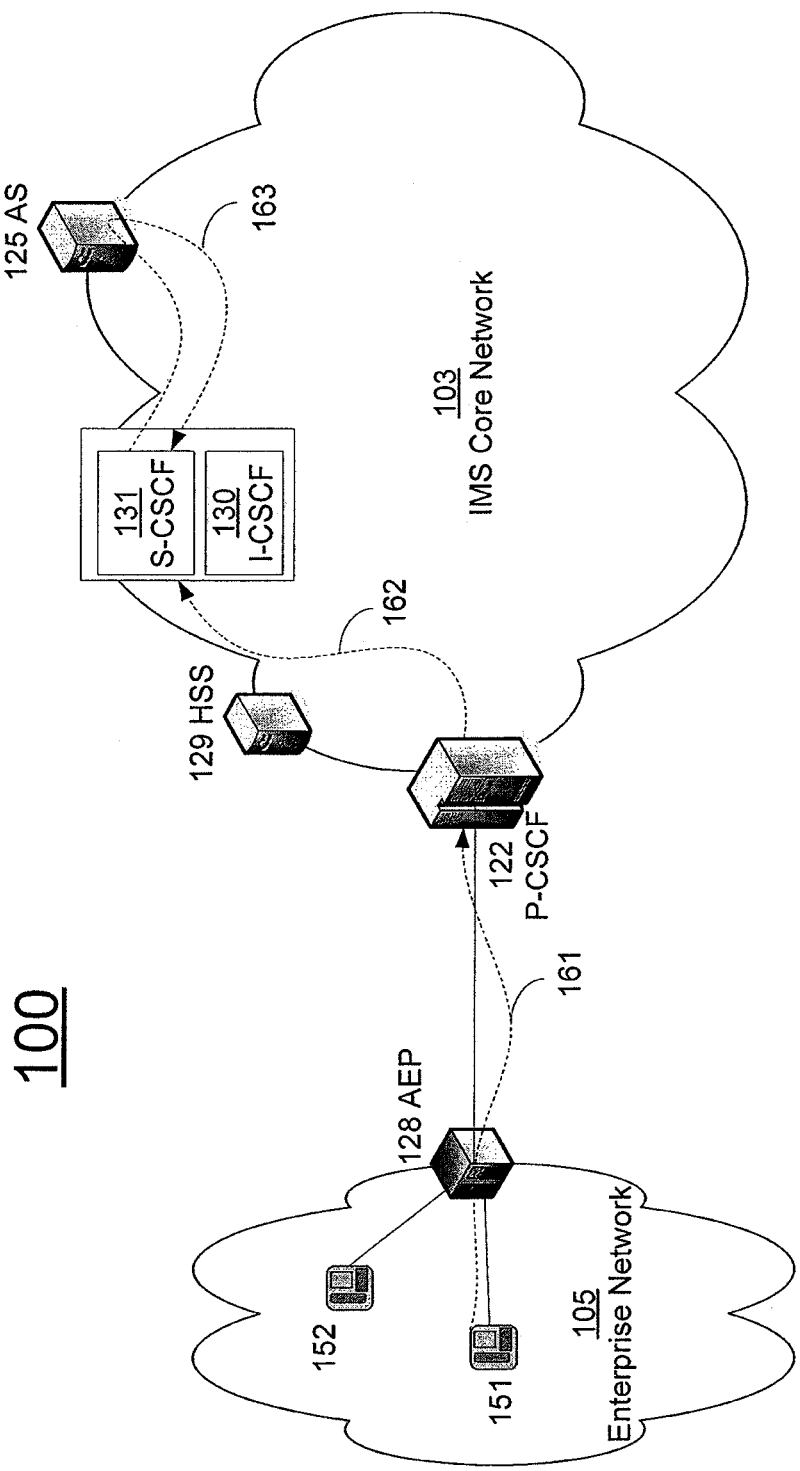
FIG. 1 illustrates an exemplary originating call flow in an IMS communication network that supports AEP devices.

In FIG. 1, network 100 comprises an enterprise network 105, e.g., a private packet switched network using Internet Protocol (IP) and an IMS core network 103, e.g., an IMS network supported by a service provider. Enterprise network 105 may comprise an AEP device 128, e.g., an IP Private Branch eXchange (IP-PBX), which supports multiple endpoints, e.g., Voice over Internet Protocol (VoIP) endpoints (e.g., telephones) in the enterprise network 105. The enterprise network 105 is connected to the IMS core network 103 via an access trunk connectivity between the AEP 128 and the P-CSCF 122 as shown in FIG. 1. In one embodiment, telephone 151 and telephone 152 are VoIP endpoint devices behind the AEP 128. In one scenario, the telephone 151, telephone 152 and AEP 128 are incapable of supporting SIP based IMS registration and the users of these devices have subscribed to IMS services provided by IMS core network 103.

It should be noted that an AEP device can be an IP PBX, an enterprise VoIP gateway, or an IP trunking interface to another VoIP network where end users behind the AEP on the other network are not known by an IMS network. For example, a SIP Aggregate Endpoint (AEP) is an endpoint that has multiple subtending users, but appears as a single SIP User Agent to an IMS network. An AEP usually connects to the IMS network via a trunk type interface. In some cases, the AEP may terminate the session itself.

In one embodiment, the HSS 129, the Interrogating Call Session Control Function (I-CSCF) 130, the S-CSCF 131, the P-CSCF 122 are IMS network elements that support IMS services and call processing in the IMS core network 103. Since AEP 128 and telephones 151 and 152 do not support SIP based IMS registration directly with the IMS core network 103, static registrations have to be performed using provisioning in the IMS network 103 in order to support IMS services to the users of the AEP 128.

In one embodiment, users of the AEP 128 are identified by a Public User Identifier (PUID) in the IMS core network 103. A PUID can be a telephone Uniform Resource Identifier (URI) or a SIP URI.

In one embodiment, a single PUID can be used to represent one or more users behind the AEP 128. For example, a user using telephone 151 and another user using telephone 152 can be represented by the same PUID. Alternatively, in another embodiment, each individual user behind the AEP 128 is represented by a unique PUID. For example, a user using telephone 151 is represented by a PUID and another user using telephone 152 can be represented by a different PUID. In a third embodiment, the AEP itself may be represented by the Public User Identity and terminate the session itself.

In one embodiment, some of the PUID(s) associated with the users of the AEP 128 will have to be provisioned as registered in the HSS 129, the S-CSCF 131, the P-CSCF 122, and the AS 125. The subscriber profile containing subscription related information associated with the PUID representing the users of the AEP 128 will have to be provisioned in the HSS 129, so that the S-CSCF 131 can retrieve the information to perform call processing when needed or has to be provisioned in the S-CSCF 131. Subscription related information includes the route headers needed to access the endpoint, the capabilities of the registration (e.g., voice, video services and the like), and the priorities of the registration. For instance, the SIP Uniform Resource Identifier (URI) of the S-CSCF that is used to process a call originating from or terminating to the users of the AEP 128, e.g., the SIP URI of S-CSCF 131, has to be provisioned in the HSS 129.

If a call is destined to an endpoint behind the AEP 128, e.g., telephone 151, the SIP URI of the P-CSCF to which the call signaling message has to be sent, e.g., the SIP URI of the P-CSCF 122, has to be provisioned in the S-CSCF 131. Also, if a call is initiated by an endpoint behind the AEP 128, the SIP URI of the S-CSCF to which the call signaling message has to be sent, e.g., SIP URI of S-CSCF 131, has to be provisioned in the P-CSCF 122.

Furthermore, the PUID associated with the users of the AEP 128 has to be provisioned as registered in the AS 125.

Referring back to FIG. 1, an originating call flow initiated by a user via an endpoint behind the AEP 128 is now described. In FIG. 1, telephone 151, a Voice over Internet Protocol (VoIP) endpoint device, is used by a user of the AEP 128 in the enterprise network 105 to originate a call using flow 161. The user of the enterprise network 105 has subscribed to IMS services with the IMS core network 103. When the call is initiated, the telephone 151 sends a call request to the AEP 128 and the AEP 128 sends the call request to the P-CSCF 122 for processing. In the present example, the telephone 151 and the AEP 128 are incapable of supporting SIP based IMS registration.

Upon receiving the call request, the P-CSCF 122 sends the call request to the S-CSCF 131 using the SIP URI of S-CSCF 131 already provisioned during static registration in the P-CSCF 122 using flow 162. In one embodiment, the P-CSCF 122 has been provisioned to treat the PUID associated with the users of the AEP 128 as registered. The P-CSCF 122 has also been provisioned with the SIP URI of S-CSCF 131, i.e., the S-CSCF to which the call request has to be sent for call processing.

Upon receiving the call request, the S-CSCF 131 sends the call request to the AS 125 based on an initial Filter Criteria (iFC) for processing using flow 163. Note that the S-CSCF 131 may interact with one or more ASs (or none at all) to process the call request. Basic service features provided by the AS 125 include, but are not limited to, digit translation, call screening, time of day routing, abbreviated or short dialing, conferencing, and messaging. These feature examples are only illustrative and should not be interpreted as limitations of the present disclosure. In the case that the S-CSCF 131 needs to interact with the AS 125, the AS 125 may need to be provisioned to treat the PUID associated with the users of the AEP 128 as being registered.

Note that the S-CSCF 131 has been provisioned to treat the PUID associated with the users of the AEP 128 as registered. Registration related information in the subscriber profile includes the route headers needed to access the endpoint, the capabilities of the registration (e.g., voice, video services and the like) and the priorities of the registration. In one embodiment, the S-CSCF 131 has been provisioned with the subscriber profile associated with the PUID or the S-CSCF 131 retrieves from the HSS 129 the subscriber profile associated with the PUID. Subscriber Profile information includes the initial Filter Criteria used to determine which Application Servers need to be included in the signaling route.

Once the AS 125 finishes processing the call request, the AS 125 sends the call request back to the S-CSCF 131 for processing. The S-CSCF 131 continues normal call processing from this point on within the IMS core network 103.

Figure 2:
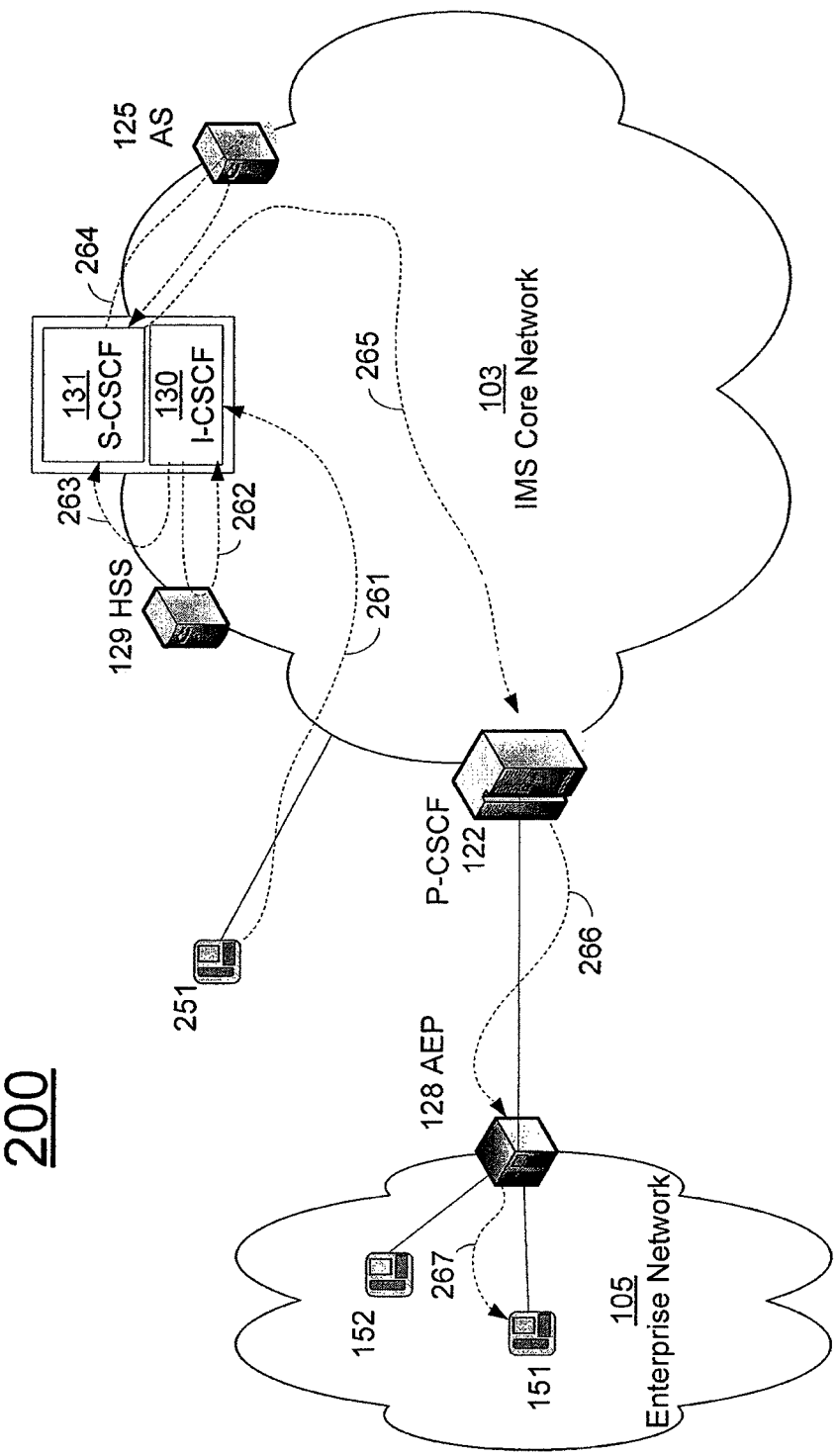
FIG. 2 illustrates an exemplary terminating call flow in an IMS communication network that supports AEP devices.

FIG. 2 illustrates an exemplary terminating call flow in an IMS communication network that supports AEP devices related to the present disclosure. In FIG. 2, network 200 is the same network as network 100 shown in FIG. 1 in terms of the network components. Referring now to FIG. 2, a terminating call flow destined to a user behind the AEP 128 is described.

In FIG. 2, a call destined to the telephone 151, a VoIP endpoint, behind the AEP 128 of the enterprise network 105 with IMS service subscription is initiated by endpoint 251 and received by IMS core network 103 using flow 261. For brevity, the access network and various network elements supporting endpoint 251 for reaching the IMS core network are not shown in FIG. 2.

Upon receiving the call request, the I-CSCF 130 queries the HSS 129 by sending a Location Information Request using flow 262 to identify the S-CSCF that needs to be used for call processing. In response, the HSS 129 sends a Location Information Answer to provide the S-CSCF, in this case the S-CSCF 131, to be used to process the call request using flow 262. Note that the HSS 129 has been provisioned to treat the PUID(s) associated with the users of the AEP 128 as registered. In addition, the HSS 129 has been provisioned with the subscriber profile associated with the PUID(s). Subscription related information in the subscriber profile includes the route headers needed to access the endpoint, the capabilities of the registration (e.g., voice, video services and the like), and the priorities of the registration.

Once the S-CSCF 131, to which the call request has to be forwarded to for call processing has been identified, the I-CSCF 130 sends the call request to the S-CSCF 131 for call processing using flow 263.

Upon receiving the call request, the S-CSCF 131 sends the call request to the AS 125 based on an initial Filter Criteria (iFC) for processing using flow 264. Basic service features provided by the AS 125 include, but are not limited to, digit translation, call screening, time of day routing, abbreviated or short dialing, conferencing, and messaging. Again, these feature examples are only illustrative. In the case that the S-CSCF 131 needs to interact with the AS 125, the AS 125 needs to be provisioned to treat the PUID(s) associated with the users of the AEP 128 as registered. Note that the S-CSCF 131 may interact with one or more ASs (or none at all) to process the call request.

In one embodiment, the S-CSCF 131 has also been provisioned to treat the PUID(s) associated with the users of AEP 128 as registered. The S-CSCF 131 has been provisioned with the subscriber profile associated with the PUID or the S-CSCF 131 retrieves from the HSS 129 the subscriber profile associated with the PUID. Registration related information in the subscriber profile includes the route headers needed to access the endpoint, the capabilities of the registration (e.g., voice, video services and the like) and the priorities of the registration. In one embodiment, the S-CSCF 131 has been provisioned with the subscriber profile associated with the PUID or the S-CSCF 131 retrieves from the HSS 129 the subscriber profile associated with the PUID. Subscriber Profile information includes the initial Filter Criteria used to determine which Application Servers need to be included in the signaling route.

The route headers needed to access the endpoint provisioned at S-CSCF 131 includes the SIP URI of the P-CSCF to be used, in this case the P-CSCF 122, to which the call request is to be sent for call processing. Once the AS processing is finished, the S-CSCF 131 sends the call request to the P-CSCF 122 using flow 265 for further call processing.

Upon receiving the call request, the P-CSCF 122 sends the call request to the AEP 128 for call termination using flow 266. The AEP 128 could send the call to telephone 151 using flow 267. In one embodiment, the P-CSCF 122 has also been provisioned to treat the PUID(s) associated with the users of AEP the 128 as registered. The P-CSCF 122 has also been provisioned with the AEP, in this case the AEP 128, to which the call request is to be sent for call termination.

Figure 3:
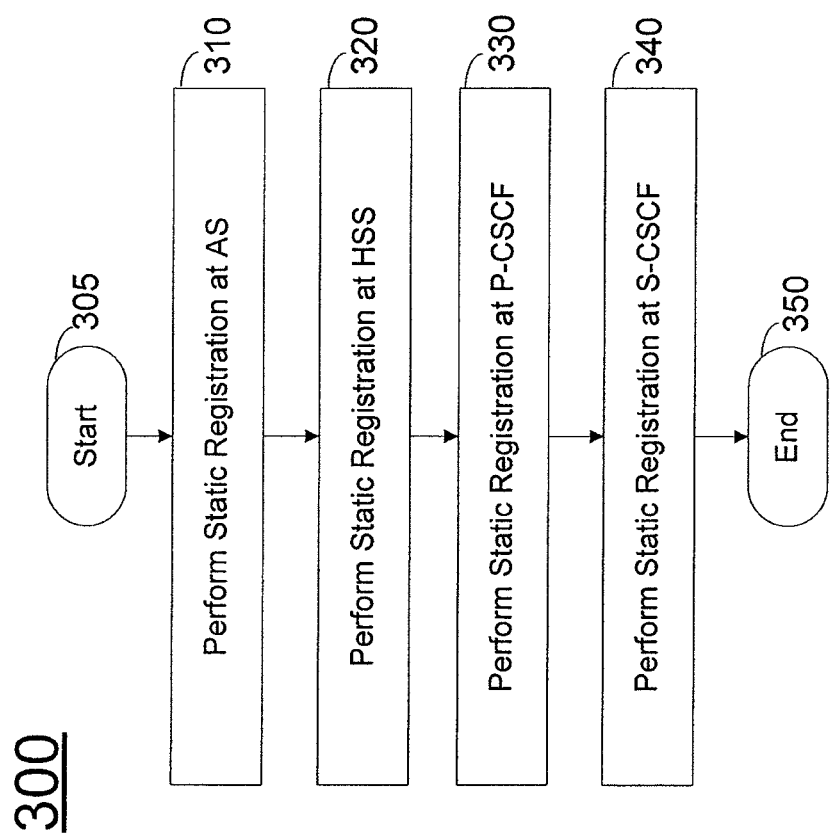
FIG. 3 illustrates a flowchart of a method of performing static registration by provisioning in an IMS communication network that supports AEP devices.

FIG. 3 illustrates a flowchart of method 300 of performing static registration by provisioning in an IMS communication network of the present disclosure. The static registration provisioning is associated with an AEP device that is incapable of performing SIP based IMS registration directly with an IMS network. Method 300 starts in step 305 and proceeds to step 310.

In step 310, the service provider provisions the PUID(s) associated with the users of an AEP which is incapable of performing standard SIP registration as registered at the AS. For example, the PUID(s) associated with the users of an AEP which is incapable of performing standard SIP registration can be provisioned as registered at the AS.

In step 320, the service provider provisions the PUID(s) associated with the users of an AEP which is incapable of performing standard SIP registration as registered and the subscriber profile comprising subscription related information including the initial Filter Criteria that need to be processed by the S-CSCF. For instance, the HSS is provisioned with the address of the S-CSCF that will be used to perform call processing for the PUID(s) and the type of services that the users associated with the PUID(s) has subscribed to with the IMS network. The HSS will respond to any queries indicating that a PUID is registered with a specific S-CSCF. Any changes to a subscriber profile including the PUID will be sent to the specific S-CSCF for update.

In step 330, the service provider provisions the PUID(s) associated with the users of an AEP which is incapable of performing standard SIP registration as registered and the address of the S-CSCF that will be used to perform call processing associated with the PUID(s) at the P-CSCF.

In step 340, the service provider provisions the PUID(s) associated with the users of an AEP which is incapable of performing standard SIP registration as registered, the subscriber profile associated with the PUID comprising subscription related information including which Application Servers should be included in the call signaling path under which conditions. It is also provisioned with registration information including the route headers needed to access the endpoint, the capabilities of the registration (e.g., voice, video services and the like), and the priorities of the registration at the S-CSCF. For instance, the S-CSCF is provisioned with the address of the P-CSCF that will be used to perform call processing for the PUID(s). The method ends in step 350.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Note that steps or blocks 310 to 340 in FIG. 3 can be performed in any order.

Figure 4:
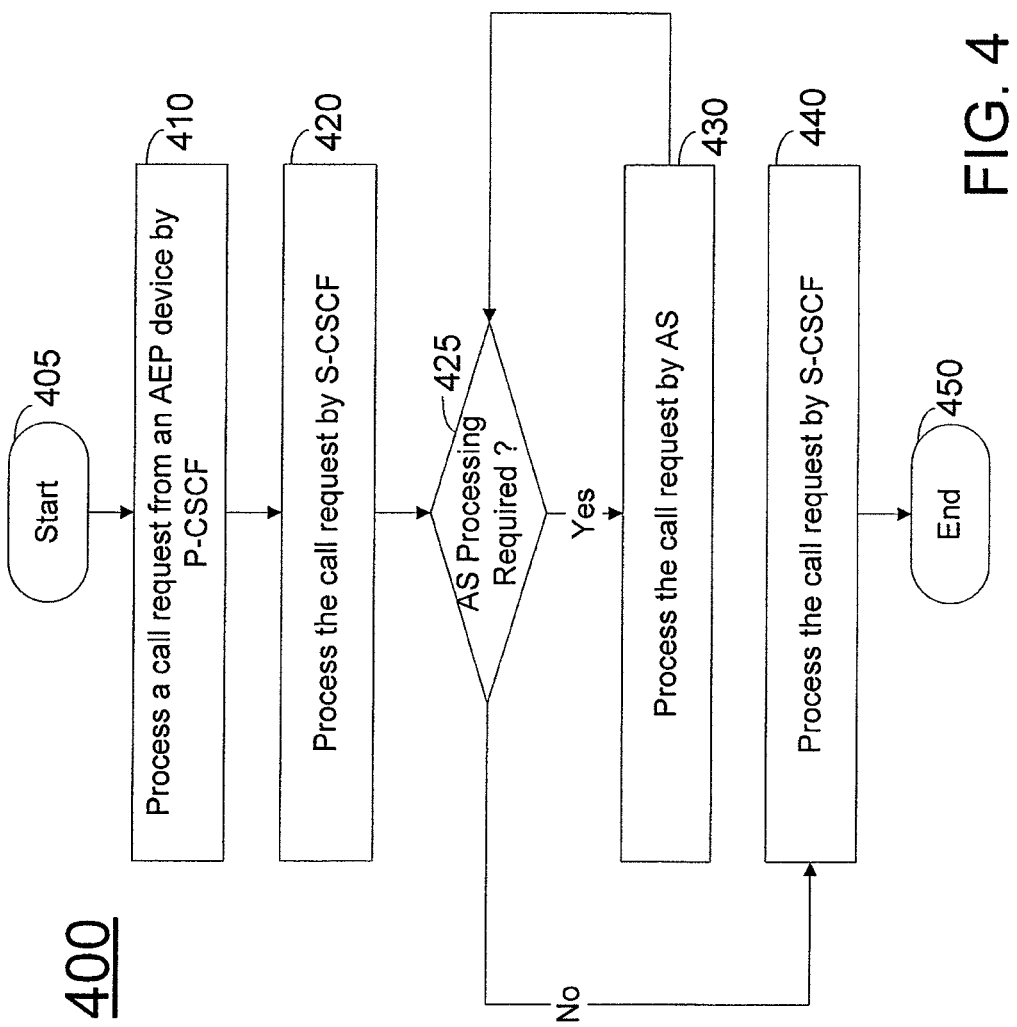
FIG. 4 illustrates a flowchart of a method of processing an originating call flow in an IMS communication network that supports AEP devices.

FIG. 4 illustrates a flowchart of method 400 of processing an originating call flow in an IMS communication network of the present disclosure. Method 400 starts in step 405 and proceeds to step 410.

In step 410, the P-CSCF receives an originating call request from an AEP. For example, the call request was originated by a user using an endpoint device behind the AEP. The P-CSCF has been provisioned to treat the PUID(s) associated with the users of the AEP as registered. The P-CSCF accepts and processes the incoming originating call request. The P-CSCF has already been provisioned during static registration with the S-CSCF to which the call request is to be sent for call processing. The P-CSCF sends the call request to the already pre-provisioned S-CSCF for call processing.

In step 420, the S-CSCF has been provisioned to treat the PUID(s) associated with the users of the AEP as registered. The S-CSCF accepts and processes the call request. The S-CSCF uses the subscriber profile associated with the PUID to process the call. The S-CSCF has been provisioned with the subscriber profile associated with the PUID or it retrieves, if necessary, the subscriber profile associated with the PUID from the HSS. Subscription related information in the subscriber profile includes the initial Filter Criteria used to determine which Application Servers to include. The S-CSCF sends the call request to an AS for call processing based on an initial Filter Criteria (iFC). Note that the S-CSCF may interact with one or more ASs (or none at all) to process the call request.

In step 425, the S-CSCF determines if AS processing is required. If AS processing is required, the method proceeds to step 430; otherwise, the process proceeds to step 440.

In step 430, the AS has been provisioned to treat the PUID(s) associated with the users of the AEP as registered. The AS accepts and processes the call request. Basic service features provided by the AS include, but are not limited to, digit translation, call screening, time of day routing, abbreviated or short dialing, conferencing, and messaging. Once AS processing is completed, the AS sends the call request back to the S-CSCF for processing. The method proceeds back to step 425 to check if additional AS processing is required. Note that a call request may be processed by one or more Application Servers.

In step 440, the S-CSCF continues normal call processing from this point on, e.g., sending the call request to the next call processing network element for call terminating processing. The method ends in step 450.

It should be noted that although not specifically specified, one or more steps of method 400 may include a storing, displaying and/or outputting step as required for a particular application. In other words, any data, records, fields, and/or intermediate results discussed in the method 400 can be stored, displayed and/or outputted to another device as required for a particular application.

Figure 5:
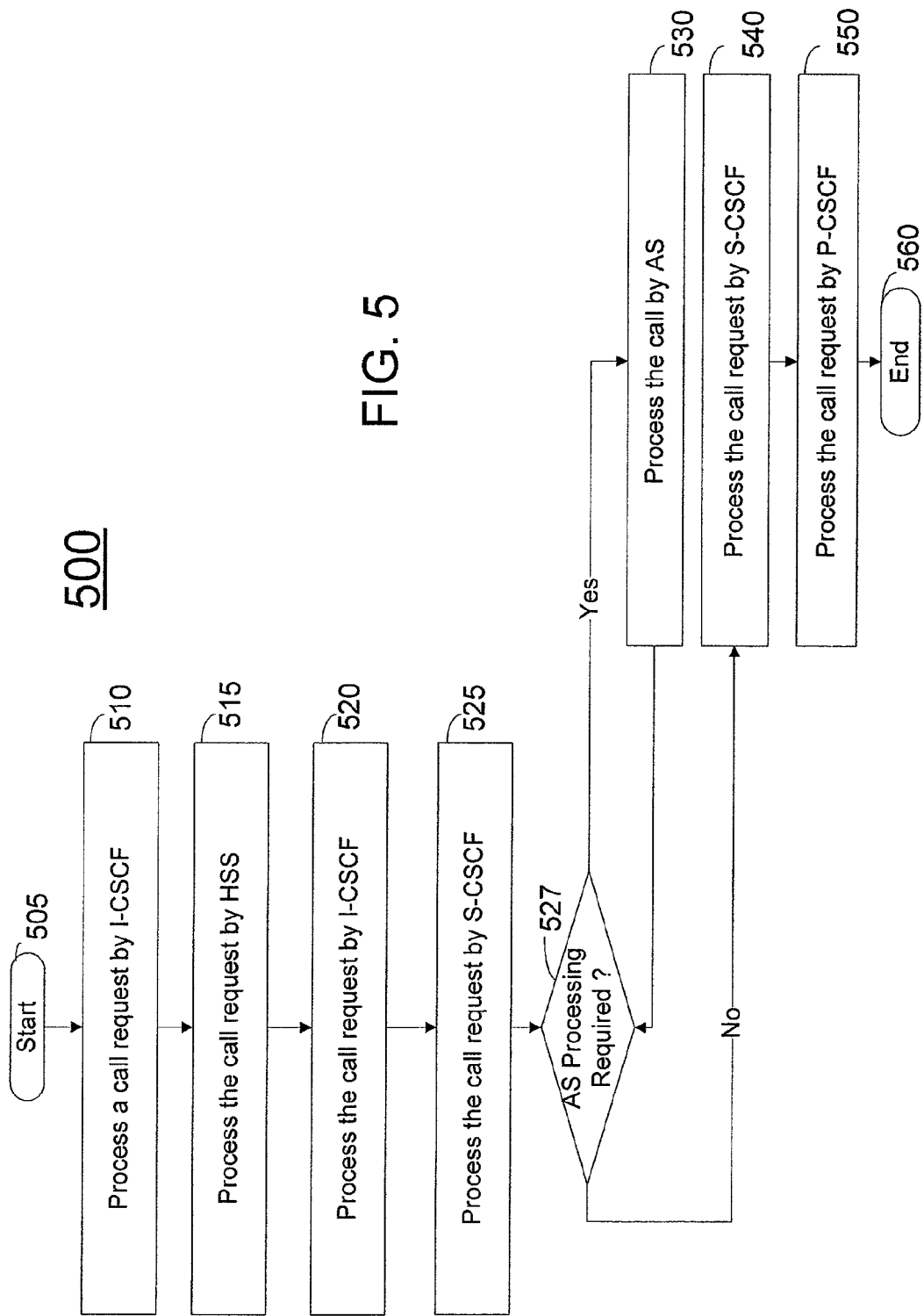
FIG. 5 illustrates a flowchart of a method of processing a terminating call flow in an IMS communication network that supports AEP devices.

FIG. 5 illustrates a flowchart of a method 500 of processing a terminating call flow in an IMS communication network of the present disclosure. Method 500 starts in step 505 and proceeds to step 510.

In step 510, the I-CSCF receives a call request destined to an endpoint behind an AEP. The I-CSCF sends a Location Information Request query associated with the call request to the HSS.

In step 515, the HSS has been provisioned to treat the PUID(s) associated with the AEP as registered and the specific S-CSCF that handles the AEP. The HSS accepts and processes the call request. The HSS has been provisioned with the subscriber profile associated with the PUID. Subscription related information in the subscriber profile includes the initial Filter Criteria used to determine which Application Servers to include in the signaling route. The HSS sends a Location Information Answer response to the I-CSCF to provide the S-CSCF to be used to process the call request.

In step 520, the I-CSCF receives the S-CSCF to which the call request needs to be forwarded for call processing from the HSS. The I-CSCF sends the call request to the identified S-CSCF.

In step 525, the S-CSCF has been provisioned to treat the PUID(s) associated with the users of the AEP as registered. The S-CSCF accepts and processes the call request. The S-CSCF uses the subscriber profile associated with the PUID to process the call. The S-CSCF has been provisioned with the subscriber profile associated with the PUID or it retrieves, if necessary, the subscriber profile associated with the PUID from the HSS. Subscription related information in the subscriber profile includes initial Filter Criteria used to determine which Application Servers should be included in the call signaling. Additionally, registration information has been provisioned including the route headers needed to access the endpoint, the capabilities of the registration (e.g., voice, video services and the like), and the priorities of the registration. The S-CSCF sends the call request to an AS for call processing based on an initial Filter Criteria (iFC). Note that the S-CSCF may interact with one or more ASs (or none at all) to process the call request.

In step 527, the S-CSCF determines if AS processing is required. If AS processing is required, the method proceeds to step 530; otherwise, the process proceeds to step 540.

In step 530, the AS has been provisioned to treat the PUID(s) associated with the users of the AEP as registered. The AS accepts and processes the call request. Basic service features provided by the AS include, but are not limited to, digit translation and call screening. Once AS processing is completed, the AS sends the call request back to the S-CSCF for processing. The method proceeds back to step 527 to check if additional AS processing is required. Note that a call request may be processed by one or more Application Servers.

In step 540, the S-CSCF has been provisioned with the terminating P-CSCF to which the call request has to be sent to for processing and sends the call request to the provisioned P-CSCF for call processing.

In step 550, the P-CSCF has been provisioned to treat the PUID(s) associated with the users of the AEP as registered. The P-CSCF accepts and processes the call request. For example, the P-CSCF has been provisioned with the terminating AEP to which the call request is to be sent for call termination and sends the call request to the terminating AEP for call processing. The method ends in step 560.

It should be noted that although not specifically specified, one or more steps of method 500 may include a storing, displaying and/or outputting step as required for a particular application. In other words, any data, records, fields, and/or intermediate results discussed in the method 500 can be stored, displayed and/or outputted to another device as required for a particular application.

Figure 6:
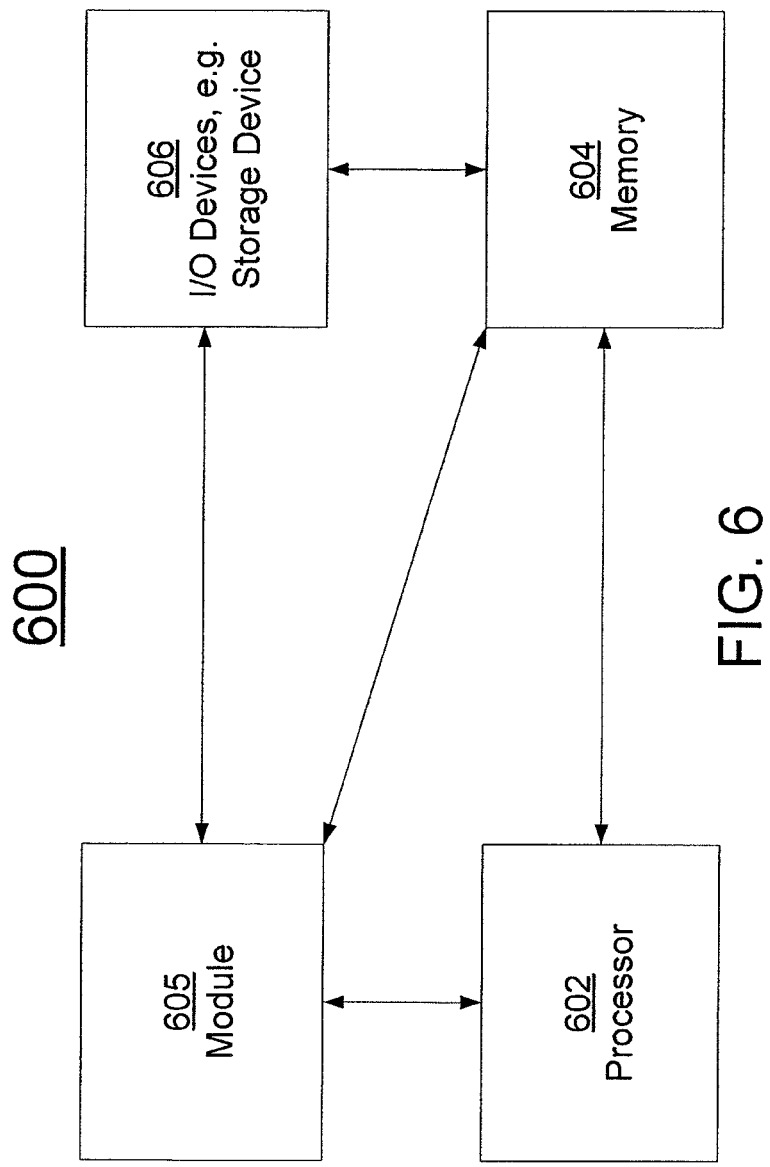
FIG. 6 illustrates a high level block diagram of a general purpose computer suitable for use in performing the functions described herein.

FIG. 6 depicts a high level block diagram of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for enabling registration of AEP devices that do not support Session Initiation Protocol (SIP) based Internet Protocol Multimedia Subsystem (IMS) registration in an IMS network through provisioning, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 605 for enabling registration of AEP devices that do not support Session Initiation Protocol (SIP) based Internet Protocol Multimedia Subsystem (IMS) registration in an IMS network through provisioning can be loaded into memory 604 and executed by processor 602 to implement the functions as discussed above. As such, the present process 605 for enabling registration of AEP devices that do not support Session Initiation Protocol (SIP) based Internet Protocol Multimedia Subsystem (IMS) registration in an IMS network through provisioning (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for enabling a registration of an aggregate end point device, comprising:

performing a static registration of the aggregate end point device that is incapable of supporting a session initiation protocol based internet protocol multimedia subsystem registration in a network element of a plurality of network elements associated with an Internet protocol multimedia subsystem network, wherein the network element comprises an application server providing a service feature, wherein the static registration comprises a registration process that is performed by the internet protocol multimedia subsystem network using a provisioning process on behalf of the aggregate end point device; and processing, by the application server, a call request associated with the aggregate end point device using the static registration.

2. The method of claim 1, wherein the plurality of network elements comprises a home subscriber server, a proxy call session control function, and a serving call session control function.

3. The method of claim 2, wherein the performing comprises:

provisioning the home subscriber server, the serving call session control function, the proxy call session control function, and the application server to treat a public user identifier associated with the aggregate end point device as registered; and provisioning a subscriber profile for the public user identifier comprising subscription related information including a plurality of route headers to access an endpoint device associated with a user, a capability, and a priority at the home subscriber server and the serving call session control function.

4. The method of claim 2, wherein the performing comprises:

provisioning a session initiation protocol uniform resource identifier of the serving call session control function at the proxy call session control function that will be used to perform call processing for a public user identifier associated with a user of the aggregate end point device; and provisioning a session initiation protocol uniform resource identifier of the proxy call session control function at the serving call session control function that will be used to perform call processing for the public user identifier associated with the user of the aggregate end point device.

5. The method of claim 2, wherein the processing the call request comprises:

receiving an originating call request from the aggregate end point device by the proxy call session control function;

accepting the originating call request based on a registered public user identifier associated with the aggregate end point device by the proxy call session control function; and forwarding the originating call request by the proxy call session control function to the serving call session control function, wherein the serving call session control function has been provisioned during the static registration.

6. The method of claim 5, wherein the processing the call request further comprises:

accepting the originating call request based on the registered public user identifier associated with the aggregate end point device by the serving call session control function; and forwarding the originating call request by the serving call session control function to the application server for processing.

7. The method of claim 6, wherein the processing by the application server comprises:

accepting the originating call request based on the registered public user identifier associated with the aggregate end point device by the application server; and providing the service feature.

8. The method of claim 2, wherein the processing the call request comprises:

receiving a terminating call request destined to the aggregate end point device by an interrogating call session control function;

querying the home subscriber server by the interrogating call session control function to identify the serving call session control function to which the terminating call request is to be forwarded to for call processing; and forwarding the terminating call request by the interrogating call session control function to the serving call session control function.

9. The method of claim 8, wherein the processing the call request further comprises:

accepting the terminating call request based on a registered public user identifier associated with the aggregate end point device by the serving call session control function;

forwarding the terminating call request by the serving call session control function to the application server for processing; and forwarding the terminating call request by the serving call session control function to the proxy call session control function for call processing, wherein the proxy call session control function has been provisioned at the serving call session control function during the static registration.

10. The method of claim 9, wherein the processing by the application server comprises:

accepting the terminating call request based on the registered public user identifier associated with the aggregate end point device; and providing the service feature.

11. The method of claim 1, wherein the static registration is not timed out by the plurality of network elements.

12. The method of claim 1, wherein the aggregate end point device comprises an internet protocol private branch exchange, where endpoint devices associate with users behind the aggregate end point are not known by the internet protocol multimedia subsystem network.

13. A tangible computer-readable storage medium storing instructions which, when executed by a processor of an application server, cause the processor to perform operations for enabling registration of an aggregate end point device, the operations comprising:

performing a static registration of the aggregate end point device that is incapable of supporting a session initiation protocol based internet protocol multimedia subsystem registration in a network element of a plurality of network elements associated with an internet protocol multimedia subsystem network, wherein the network element comprises the application server providing a service feature, wherein the static registration comprises a registration process that is performed by the Internet protocol multimedia subsystem network using a provisioning process on behalf of the aggregate end point device; and processing a call request associated with the aggregate end point device using the static registration.

14. The tangible computer-readable storage medium of claim 13, wherein the plurality of network elements comprises a home subscriber server, a proxy call session control function, and a serving call session control function.

15. The tangible computer-readable storage medium of claim 14, wherein the performing comprises:
provisioning the home subscriber server, the serving call session control function, the proxy call session control function, and the application server to treat a public user identifier associated with the aggregate end point device as registered; and
provisioning a subscriber profile for the public user identifier comprising subscription related information including a plurality of route headers to access an endpoint device associated with a user, a capability, and a priority at the home subscriber server and the serving call session control function.

16. The tangible computer-readable storage medium of claim 14, wherein the performing comprises:
provisioning a session initiation protocol uniform resource identifier of the serving call session control function at the proxy call session control function that will be used to perform call processing for a public user identifier associated with a user of the aggregate end point device; and
provisioning a session initiation protocol uniform resource identifier of the proxy call session control function at the serving call session control function that will be used to perform call processing for the public user identifier associated with the user of the aggregate end point device.

17. The tangible computer-readable storage medium of claim 14, wherein the processing the call request comprises:
receiving an originating call request from the aggregate end point device by the proxy call session control function;
accepting the originating call request based on a registered public user identifier associated with the aggregate end point device by the proxy call session control function; and
forwarding the originating call request by the proxy call session control function to the serving call session control function, wherein the serving call session control function has been provisioned during the static registration.

18. The tangible computer-readable storage medium of claim 13, wherein the static registration is not timed out by the plurality of network elements.

19. The tangible computer-readable storage medium of claim 13, wherein the aggregate end point device comprises an Internet protocol private branch exchange, where endpoint devices associate with users behind the aggregate end point are not known by the Internet protocol multimedia subsystem network.

20. A system for enabling registration of an aggregate end point device, comprising:
a processor of an application server; and
a tangible computer-readable medium in communication with the processor, to store a plurality of instructions which, when executed by the processor, cause the processor to perform operations, the operations comprising:
performing a static registration of the aggregate end point device that is incapable of supporting a session initiation protocol based internet protocol multimedia subsystem registration in a network element of a plurality of network elements associated with an Internet protocol multimedia subsystem network, wherein the network element comprises the application server providing a service feature, wherein the static registration comprises a registration process that is performed by the Internet protocol multimedia subsystem network using a provisioning process on behalf of the aggregate end point device; and
processing a call request associated with the aggregate end point device using the static registration.

* * * * *